US005311420A

United States Patent [19]

Zarfoss et al.

[11] Patent Number: 5,311,420

[45] Date of Patent: May 10, 1994

[54] AUTOMATIC BACK CORONA DETECTION AND PROTECTION SYSTEM

[75] Inventors: James R. Zarfoss, Timonium, Md.; Richard A. Hoch, New Freedom, Pa.

[73] Assignee: Environmental Elements Corp., Baltimore, Md.

[21] Appl. No.: 913,920

[22] Filed: Jul. 17, 1992

[51] Int. Cl.[5] .......... G05B 13/02; B03C 3/68

[52] U.S. Cl. .......... 364/148; 95/6; 96/23; 323/903; 364/400; 364/483

[58] Field of Search .......... 364/148, 400, 551.01, 364/550, 480, 483; 55/2, 105, 4, 139; 323/903, 241, 245, 246; 95/6; 96/18-26

[56] References Cited

U.S. PATENT DOCUMENTS 4,410,849 10/1983 Ando .......... 323/903 X
4,626,260 12/1986 Jorgensen .......... 323/903 X
4,626,261 12/1986 Jorgensen .......... 323/903 X
4,811,197 3/1989 Wexler .......... 364/148
4,996,471 2/1991 Gallo .......... 323/903 X

*Primary Examiner*—Joseph Ruggiero
*Attorney, Agent, or Firm*—Morton J. Rosenberg; David I. Klein

[57] ABSTRACT

An automatic back corona detection and protection system (200) is provided for controlling an electrostatic dust precipitator (80). The system (200) includes a subsystem for monitoring voltage and current parameters of the high voltage transformer/rectifier (70) of the electrostatic dust precipitator system (100). On a periodic basis, automatic back corona detection and protection system (200) tests dust precipitator (80) to determine what operating conditions are conducive to back corona generation, operating parameters being utilized by the energization control (210) during the test, and then operates dust precipitator (80) at voltage and current values below those for which back corona conditions were detected. In detecting back corona, system (200) utilizes two methods of detection (220, 230). The subsequent adjustment of the precipitator operating conditions being made more accurate by a deenergization of the precipitator following detection of back corona to quench the back corona and permit proper adjustment of the precipitating operating parameters. Still further, system (200) provides for optimization of an intermittent operating mode wherein the pulse repetition rate of the voltage supplied to precipitator (80) is optimized to substantially prevent back corona.

17 Claims, 10 Drawing Sheets

Microfiche Appendix Included
(91 Microfiche, 1 Pages)

AUTOMATIC BACK CORONA DETECTION AND PROTECTION SYSTEM

A microfiche Appendix is included in this Application containing one (1) microfiche. The microfiche is entitled "Source Code for Automatic Back Corona Detection and Correction System" containing ninety (90) frames plus one (1) test target frame for a total of ninety-one (91) frames.

BACKGROUND OF THE INVENTION

1. Field of the Invention

This invention is directed to a control system for an electrostatic dust collection system. In particular, this invention relates to electrostatic dust collection control systems having means for adjusting system parameters responsive to feedback signals from the system. More in particular, this invention relates to an electrostatic dust collection control system which periodically determines what operating system parameters produce back corona conditions and then automatically adjusts the system operating parameters to substantially preclude generation of back corona. Still further, this invention directs itself to an electrostatic dust collection control system which utilizes multiple methods for detecting the existence of a back corona condition. Further, this invention relates to an electrostatic dust precipitator control system which automatically periodically determines what operating conditions are conducive to back corona generation and uses those values to limit the input power supplied to the high voltage transformer/rectifier of the system to substantially prevent back corona in the precipitator. Additionally, the control system provides for optimization of an intermittent mode of operation wherein the number of "off" cycles between energizing "on" cycles is optimized to prevent back corona.

2. Prior Art

Control systems for electrostatic dust collection systems are well known in the art. The best prior art known to the Applicants include U.S. Pat. No. 4,811,197; U.S. Pat. No. 4,390,830; U.S. Pat. No. 4,521,228; U.S. Pat. No. 4,432,061; and, U.S. Pat. No. 4,326,860.

In some prior art systems, such as that disclosed in U.S. Pat. No. 4,811,197, having the same Assignee as the instant invention, an adaptive control system is utilized for controlling the operating parameters of the dust precipitator responsive to feedback signals from the high voltage transformer/rectifier supplying the precipitator. However, that system utilizes only a single method for determining the existence of back corona, utilizing a decrease in slope of the minimum AC ripple waveform to identify the existence of back corona. While this method is a better method of detection than use of the average value of the secondary voltage, it is not as accurate in determining the existence of back corona as the method of monitoring the instantaneous minimum voltage peak value, as utilized in the instant invention. Further, to insure detection of the existence of back corona, the instant invention, utilizes two methods for analyzing the secondary voltage applied to the precipitator, which provides a more accurate indication of back corona conditions, not seen in the prior art.

In other prior art systems, such as that disclosed in U.S. Pat. No. 4,390,830, there is provided a control system which identifies back corona by comparing the current supplied to the precipitator with an average value of the precipitator voltage, to indicate the presence of back corona when the current begins to increase more rapidly than the voltage. The control system responds to back corona detection by reducing the current until the back corona condition is minimized in an attempt to operate at the knee of the voltage/current curve. However, the voltage/current curve characteristic exhibits a hysteresis type effect when the current is just lowered, as opposed to being removed totally and the system then driven to the desired lower current value, and thus such prior art systems do not maximize the operating voltage of the precipitator, as provided by the instant invention.

SUMMARY OF THE INVENTION

An automatic back corona detection and protection system is provided for controlling an electrostatic dust precipitator. The automatic back corona detection and protection system includes a subsystem for monitoring voltage and current parameters of a high voltage transformer/rectifier of the electrostatic dust precipitator. The automatic back corona detection and protection system further includes a first method for detecting a back corona condition by detecting a lack of decrease, becoming more negative, in a minimum peak voltage value of the output voltage of a high voltage transformer/rectifier coincident with an increase in an output current value of the high voltage transformer/rectifier as the input power to the high voltage transformer/rectifier is increased. A second subsystem for detecting back corona is also provided, the second detection subsystem identifying a back corona condition responsive to an increase, becoming more positive, in the minimum peak voltage value of the output voltage of the high voltage transformer/rectifier as the input power to the high voltage transformer/rectifier is increased. The automatic back corona detection and protection system further includes a control subsystem coupled to both the first and second back corona detecting subsystems for controlling input power to the high voltage transformer/rectifier responsive to detection of a back corona condition by either of the first or second detection subsystems.

DESCRIPTION OF THE PREFERRED EMBODIMENT

Figure 1:
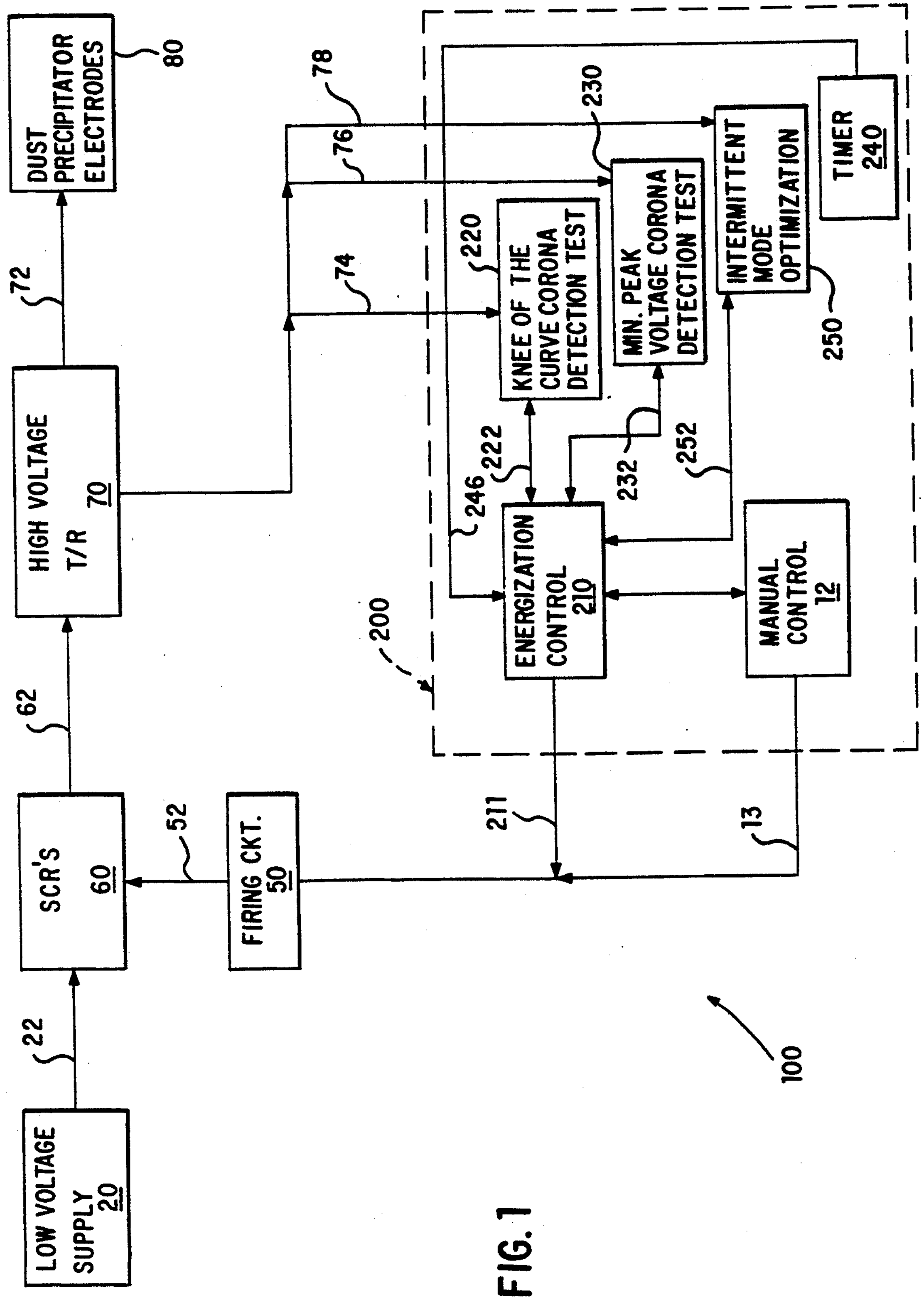
FIG. 1 is an overall block diagram of the electrostatic dust collection system.

Referring now to FIG. 1, there is shown electrostatic dust collection system 100 including back corona detection and protection system 200 for automatically maintaining the optimization of the dust precipitator electrode voltage by periodically testing for back corona conditions, and adjusting the precipitator operating parameters for substantially avoiding operation with back corona. Thus precipitator 80 is a high voltage direct current ionization type dust collector which is well-known in the art, and is supplied power from the high voltage transformer/rectifier 70. The operation of the dust precipitator 80 is controlled in response to feedback signals from the high voltage transformer/rectifier 70 by means of an adaptive control system, such as that disclosed in U.S. Pat. No. 4,811,197, having a common Assignee with the instant invention, and incorporated herein by reference.

In general overall concept, electrostatic dust collection system 100 includes back corona detection and protection system 200 for substantially maintaining optimum operating parameters of the precipitator 80 while substantially preventing back corona. Optimum operating parameters without the production of back corona is made possible by the periodic measurement of operating parameters which indicate the presence of back corona, and automatically adjusting the operating parameters of the precipitator accordingly. Energization control 210 of back corona detection and protection system 200 transmits control signals to the firing circuit 50 in response to criteria established by either one of two back corona detection tests, indicated by blocks 220 and 230 for maintaining the operating parameters of the high voltage transformer/rectifier 70 at levels which maximize performance, yet do not produce a back corona condition within the precipitator 80.

While methods for detecting back corona conditions within electrostatic dust precipitators are well-known in the art, such prior art systems have not had the capability of automatically adjusting the precipitator operating parameters responsive to the back corona conditions within the precipitator, as they change over time, or were limited to detecting back corona by only one method. Back corona detection and protection system 200 continually provides for optimization of the precipitator operation by making frequent periodic tests to detect the onset of back corona, and utilizing those measurements to establish the proper precipitator operating parameters. This is particularly important for modern boiler systems which are designed to be operated using any one of a plurality of different types of fuel. Such systems frequently are started utilizing a clean burning fuel, such as natural gas and then subsequently switched to some other fossil fuel, such as coal. When the fuel is changed from one source to another, the particulates passing through the precipitator will have different characteristics, as does coal from different sources, which also leads to differences in the particulate composition entering the precipitator.

Thus, as the characteristics of the particulates entering the precipitator change, so must the precipitator's operating parameters if precipitator efficiency is to be maximized. Since the occurrence of back corona degrades the collecting efficiency of electrostatic precipitators, it is particularly important that the precipitator be operated so as to preclude the generation of back corona within the precipitator. However, the higher the ionizing potential supplied to the precipitator, the higher the collecting efficiency thereof. Therefore, in order to achieve the highest possible ionizing potential within the dust precipitator without generating back corona, system 200 provides two methods for operating the high voltage transformer/rectifier 70 for achieving the aforementioned optimization and two methods of back corona detection for one method of operation and a third method of back corona detection for the other method of operation.

Referring further to FIG. 1, there is shown electrostatic dust collection system 100 having a low voltage supply 20. Low voltage power supply 20 provides conventional single-phase, 480 volt, 60 Hz Ac power to system 100. The input power is coupled to an electronic switch in the form of silicon controlled rectifiers (SCR's) 60 by line 22. Although not shown, the input, provided by line 22 may be protected by overcurrent devices, such as circuit breakers, or remotely controlled contactors, well known in the art. When the SCR's 60 are turned on, as will be described in following paragraphs, the input power is transmitted to the high voltage transformer/rectifier unit 70 by line 62. High voltage transformer/rectifier 70 converts the 480 volt AC input to a high voltage direct current which is transmitted to the dust precipitator electrodes 80 by line 72. The high voltage produced by high voltage transformer/-rectifier 70 has an approximate range in magnitude from 0.0 to 80,000 volts, which is provided to the dust precipitator electrodes 80 in the form of direct current pulses.

The switching characteristics of the SCR unit 60 are responsive to gate control signals coupled to SCR unit 60 from firing circuit 50 by line 52. The gate control signal output from the firing circuit 50 is proportional to a control current signal from either the manual control 12 on line 13 or the energization control 210 on line 211. Manual control unit 12 outputs the control current signal on line 13 to firing circuit 50 responsive to particular manual inputs of an operator when manual operation is selected in place of the normal automatic operational mode. Firing circuit 50 converts the control current signal from either the manual control 12 or the energization control 210 to the analog gate control signals required to operate the SCR's in the electronic switching unit 60.

Figure 2:
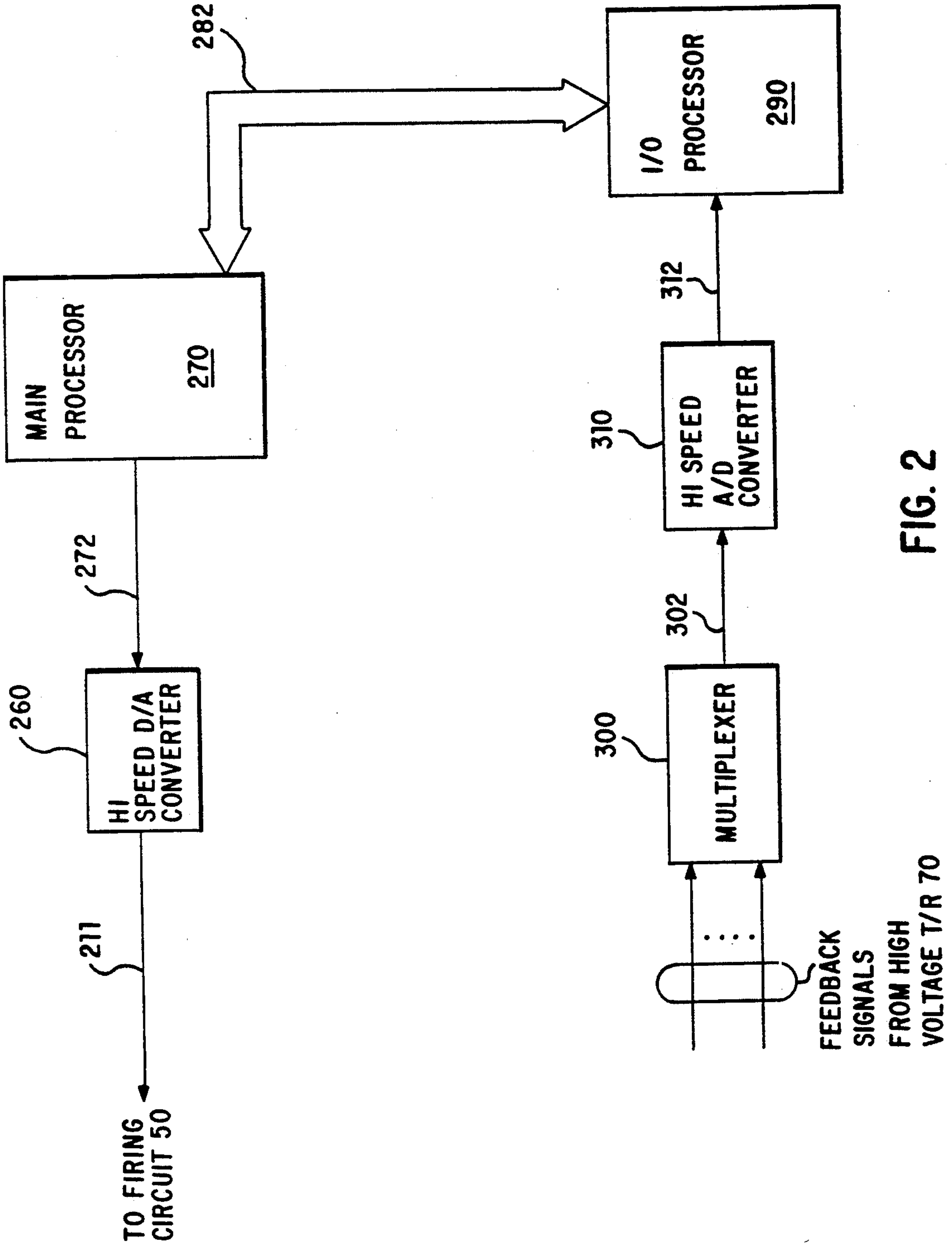
FIG. 2 is a block diagram of the adaptive control system portion of the electrostatic dust collection system shown in FIG. 1.

In the automatic mode, firing circuit 50 is controlled responsive to the control current signal output from energization control 210 on coupling line 211. As shown in FIG. 2, the control signals supplied to firing circuit 50 on line 211 originate in main processor 270 which provides a digital output on line 272 to the high speed digital-to-analog converter 260, which in turn provides the output on line 211. Main processor 270 communicates with the input/output processor 290 through a high speed data link 282, which may be a serial data link with appropriate interface devices for coupling to the processors. I/O processor 290 receives the feedback signals from the high voltage transformer/rectifier 70 supplied through multiplexer 300 to a high speed analog-to-digital converter 310 by the coupling line 302. The output of high speed analog-to-digital converter 310 is provided on line 312 for coupling the digitized feedback signals to the processor 290. The digital signals which represent the feedback signals from high voltage transformer/rectifier 70 are transmitted to main processor 270 through the high speed data link 282 for processing therein. This data flow path is shown in the block diagram of FIG. 1 as the connection lines 74, 76 and 78, providing the feedback signals to the respective processing modules 220, 230 and 250, each having a respective coupling to the energization control 210 through respective coupling lines 222, 232 and 252. A timer module 240 is provided for periodically enabling both the knee of the curve corona detection test 220 and the minimum peak voltage corona detection test 230 for maintaining the optimum performance of dust precipitator 80. Timer module 240 provides the back corona test interval signal to energization control 210 through line 246, for quenching any existing back corona condition, and to enable the test modules 220 and 230 by their coupling with control 210 through coupling lines 222 and 232, respectively.

Referring now to FIGS. 3A–3E, there are shown software flow diagrams for main processor 270, and in particular, are shown flow diagrams directed to the back corona detection tests of the automatic back corona detection and protection system 200. These software flow diagrams as will be described in following paragraphs are representative of the computer program listing included in the microfiche Appendix provided with this Application. The flow enters at 400 from the main processor program and goes to block 405 where the feedback input data is obtained from the input/output processor 290. When the input data are received, flow passes to block 410 where the input data are used to calculate the appropriate limits for the operating system parameters, as defined by the system described in U.S. Pat. No. 4,811,197. Flow then passes through the connector 1 to decision element 455, shown in FIG. 3B, where it is determined whether back corona has previously been detected. If it had, then the flow passes through connector 5 to decision element 530, shown in FIG. 3E. Decision block 530 determines whether the timing interval, established through the timer 240 has expired. Expiration of the time interval indicating that a back corona test procedure is to be initiated. If the time interval has not yet expired, then the flow passes through connector 2 to decision element 415, shown in FIG. 3A. In decision block 415 the input data are tested to determine whether it is over the predetermined limits or not. If it is over the limits, flow passes to block 420 where power is reduced, if it is not over the limits, flow passes to decision element 430 for determination if any of the parameters are at the calculated limits. If any of the parameters are at a calculated limit, flow passes to block 435 where an alarm condition is set, if all of the parameters are below the limits, then flow passes to block 440 where the power to the precipitator electrodes is increased. In the case where the limits are exceeded and power is reduced, the flow passes from block 420 to block 425, where the back corona limits and variables are initialized so that a new operating point can be established without back corona the next cycle through the routine. From blocks 425, 440 and 435 flow passes back to the main processor program through block 450.

The next time through the subroutine when flow passes to decision block 455, the initialized values will provide flow from block 455 to decision block 460 where we determine whether the secondary voltage is above a predetermined threshold value. This predetermined threshold value permits an operating potential below which back corona will not be considered. If that threshold has not been exceeded then the subroutine is exited as was previously described for the case where back corona had been previously detected. If the threshold voltage has been exceeded then flow passes to decision block 465 where it is determined whether power is currently being reduced under control of another software module. If power is being reduced then the subroutine is exited, as before. If power is not being reduced flow passes to decision block 470, which begins the peak voltage corona detection test. Decision block 470 determines whether the minimum peak secondary voltage has increased, become more positive, by a predetermined amount from the last sampling cycle (see point 3 of FIG. 4). If the minimum peak value has increased then flow passes to block 485, shown in FIG. 3C, through connector 3. Block 485 sets a flag indicating detection of back corona and provides for storage of the secondary voltage and secondary current values at which back corona was detected. Flow then passes to decision block 490 where it is determined whether the system is being operated in the intermittent energization mode or not. If the system is operating in the continuous energization mode, as opposed to the intermittent mode, flow passes to block 495 where power is reduced, the SCRs are cut off, to quench back corona. Flow then passes to block 500, where a new limit for the secondary current is calculated to be slightly below the current at which back corona was detected. From block 500 the flow passes through connectors 7 and 2 to return to the main program, as previously described.

If in decision block 470 the secondary voltage minimum peak has not increased, not become more positive, by a predetermined amount then flow passes to decision block 475, where the knee of the curve back corona detection test is initiated. Decision block 475 determines whether the secondary voltage is remaining constant. If it is not, such indicates that the minimum peak of the secondary voltage is continuing to become more negative, which is normal (see point 2 of FIG. 6), and thus flow passes through connector 5 to exit the subroutine by the flow path previously described. If however the secondary minimum peak voltage has remained constant (see point 3A of FIG. 6) then flow passes through connector 4 to decision block 480, shown in FIG. 3C. Decision block 480 determines whether there has been an increase in secondary current while the secondary minimum peak voltage has remained constant. If the secondary current has not increased then operation is normal and the flow then passes through connector 5 to exit the subroutine, as previously described. If on the other hand, the secondary current has increased, while the secondary minimum peak voltage has remained constant, such indicates back corona and flow passes to block 485 where the back corona indicating flag is set and the value of secondary current and voltage are stored. From block 485 flow passes to decision block 490, and if the intermittent energization mode is not selected flow continues to blocks 495 and 500, as previously described.

Figure 3A:
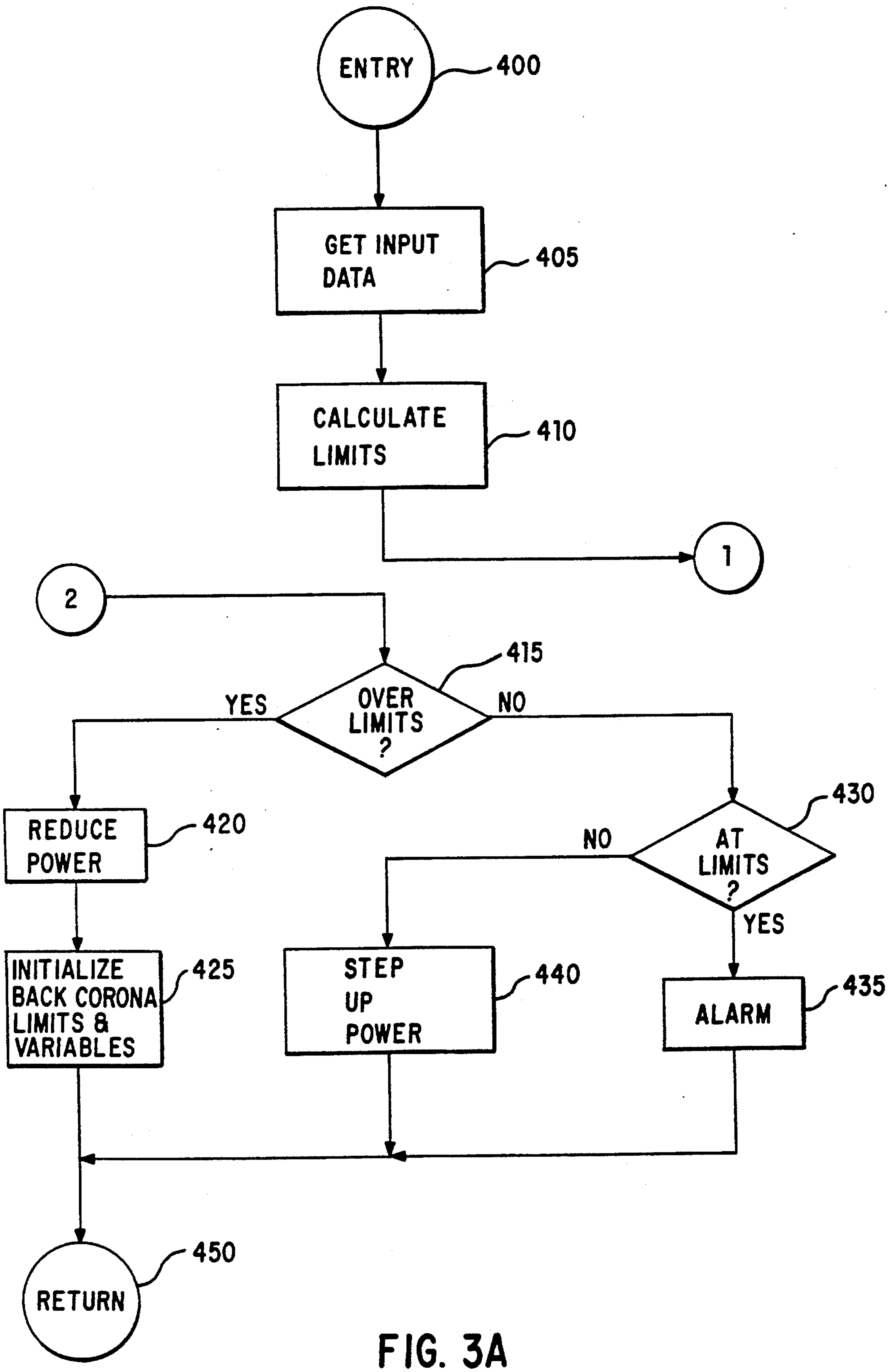
FIG. 3A is a logic flow diagram for the power control logic of the main processor.
Figure 3B:
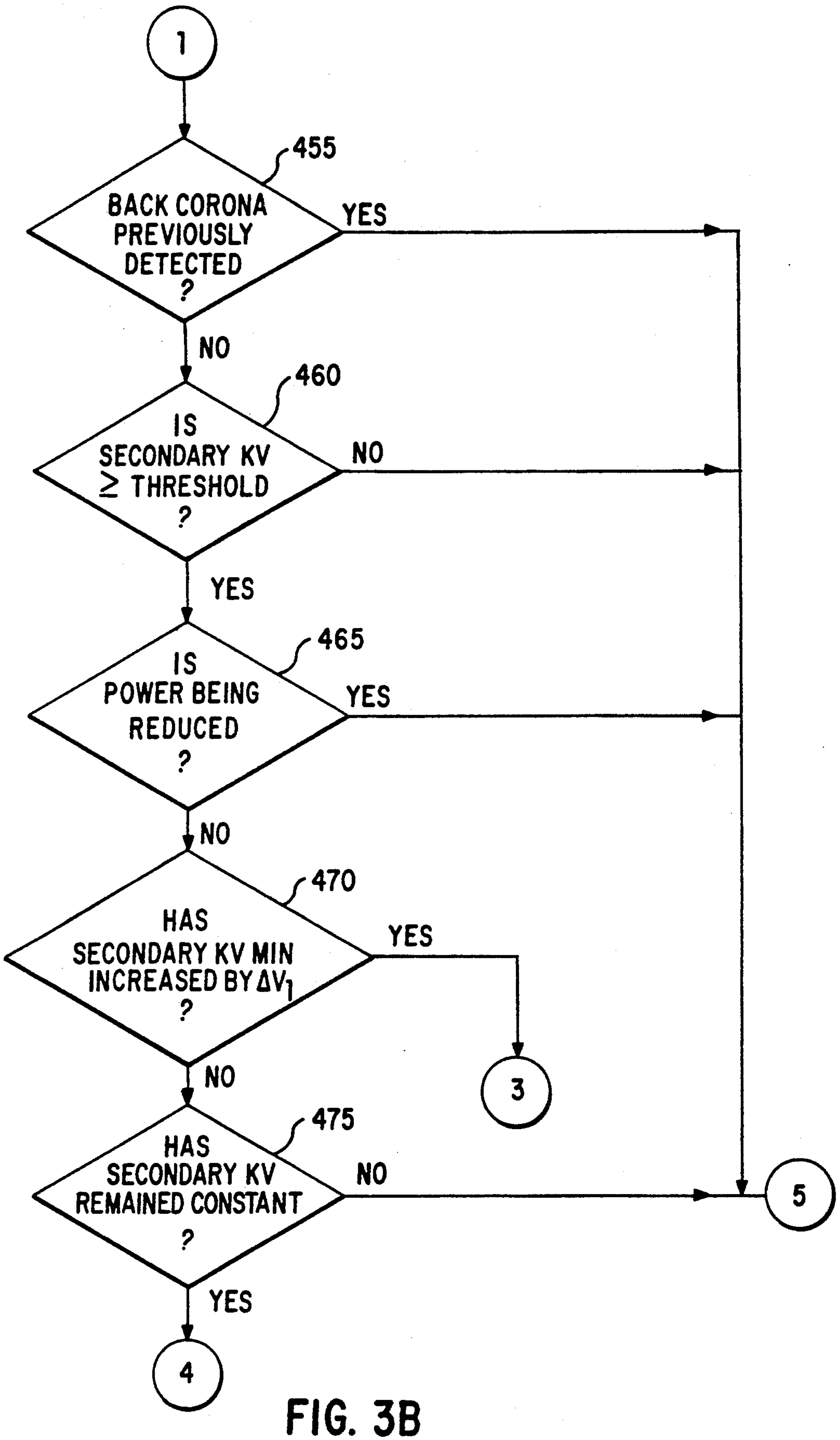
FIGS. 3B, 3C, 3D and 3E are logic flow diagrams for the automatic back corona detection and protection system.
Figure 3C:
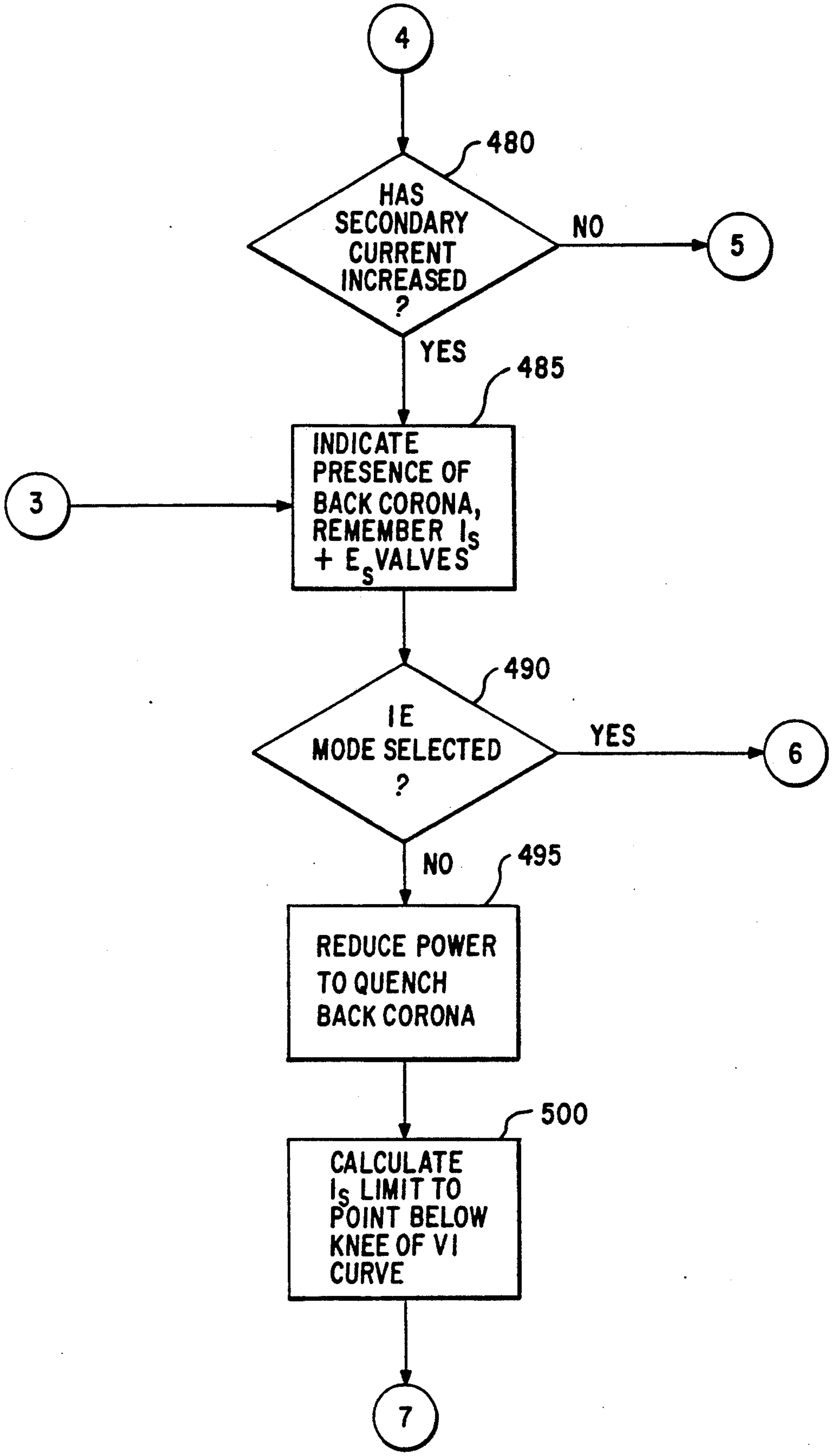
Figure 3D:
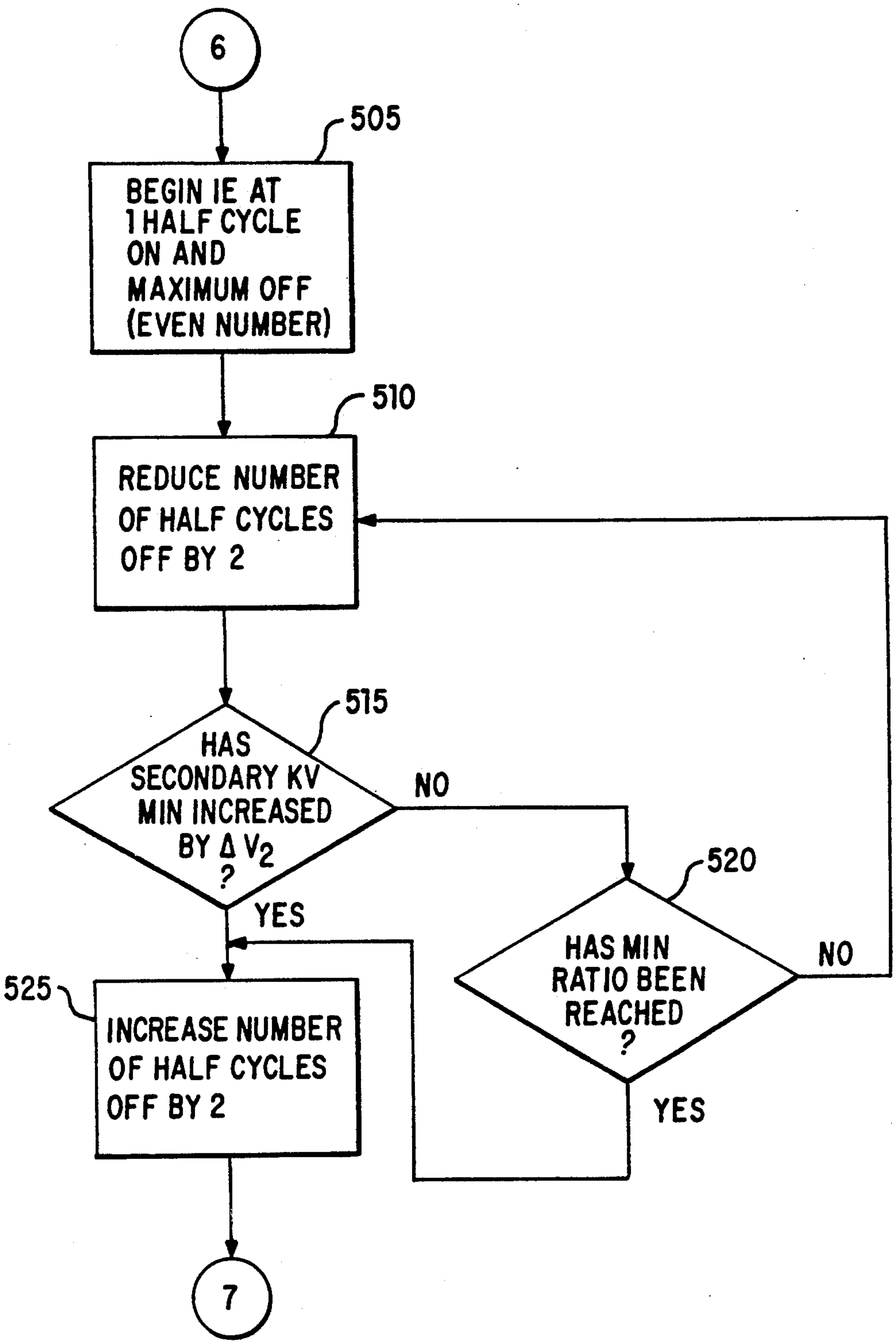
Figure 3E:
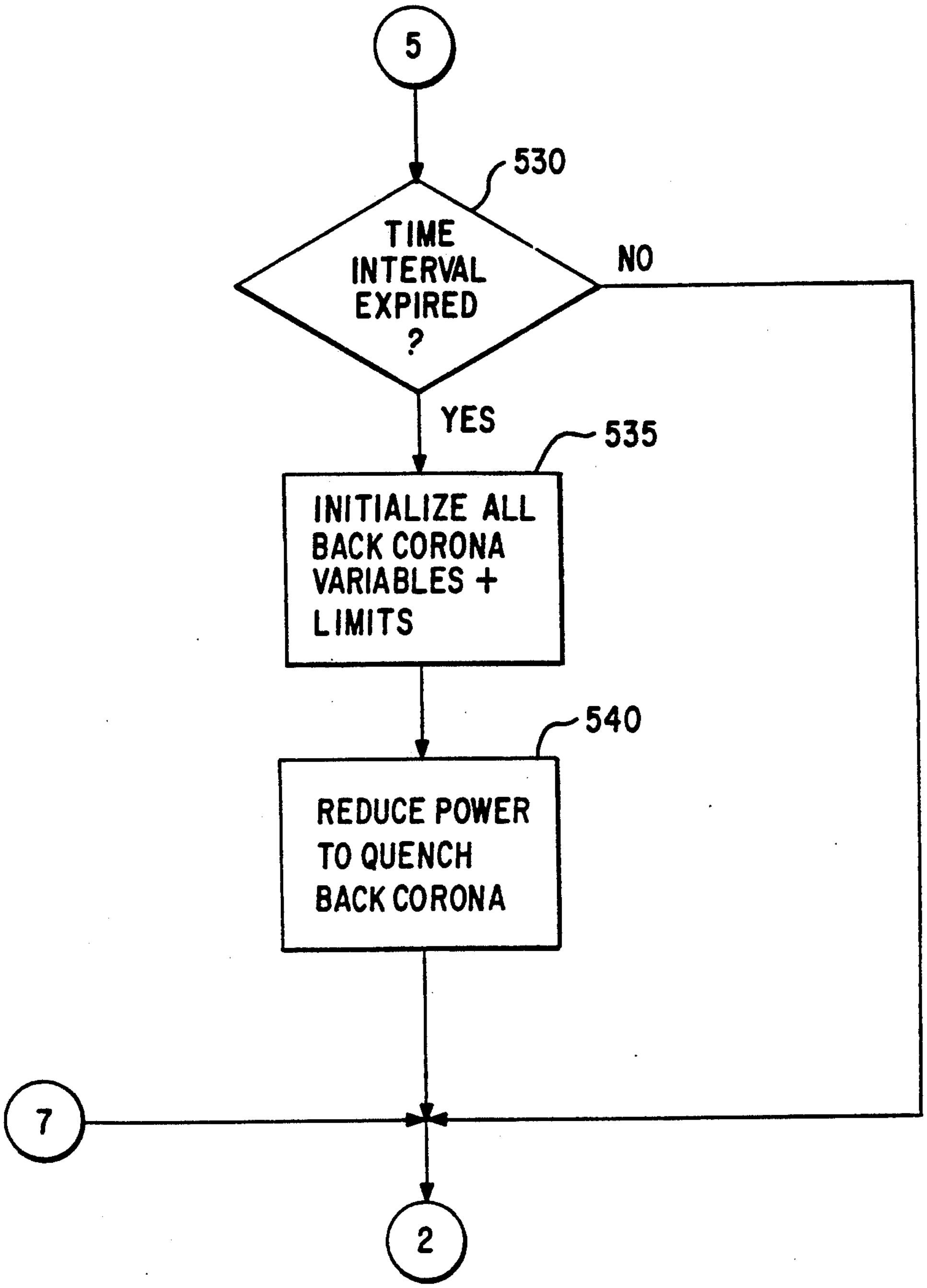

When the system is in the intermittent energization mode (an operator selectable option) flow transfers from the decision block 490 to block 505, shown in FIG. 3D through connector 6. In the intermittent energization mode the precipitator is energized by voltage pulses separated by a predetermined number of "off" cycles, the precipitator being energized by one-half cycle "on" followed by a predetermined number of "off" half-cycles, the ratio of "on" to "off" half-cycles being optimized to prevent back corona. Block 505 initiates the optimization procedure by providing one-half cycle "on" and a predetermined maximum number of "off" half-cycles, for example, one "on" half-cycle followed by twenty "off" half-cycles. Flow then passes to block 510 wherein the number of half-cycles "off" are reduced by two. "Off" half-cycles are incremented by two to prevent establishing a DC component in the transformer rectifier set 70, incrementing by an even number of half-cycles insures that every half-cycle "on" is of opposite polarity through the transformer from the half-cycle "on" which preceded it.

From block 510 flow passes to decision block 515 wherein it is determined whether the secondary voltage minimum peak has increased, become more positive by a predetermined amount. If the increase has not occurred then flow passes to decision block 520 where it is determined whether the minimum ratio of "on" to "off" cycles has been reached. If it has not, flow passes back to block 510 for further reduction of the number of "off" half-cycles. If on the other hand the increase in minimum peak voltage has been detected then flow passes to block 525, as does flow from decision block 520 if the minimum ratio of "on" to "off" half-cycles has been reached. Block 525 increases the number of half-cycles "off" by a predetermined amount to provide a safe operating margin for the system. From block 525 flow passes through connectors 7 and 2 to exit the routine. This intermittent mode optimization routine permits the precipitator to be operated at the maximum peak operating values, voltage and current, for the transformer/rectifier, without regard to the associated average voltage limits which would otherwise be utilized in the continuous energization mode. The optimized pulse repetition rate provides operation without back corona.

Figure 4:
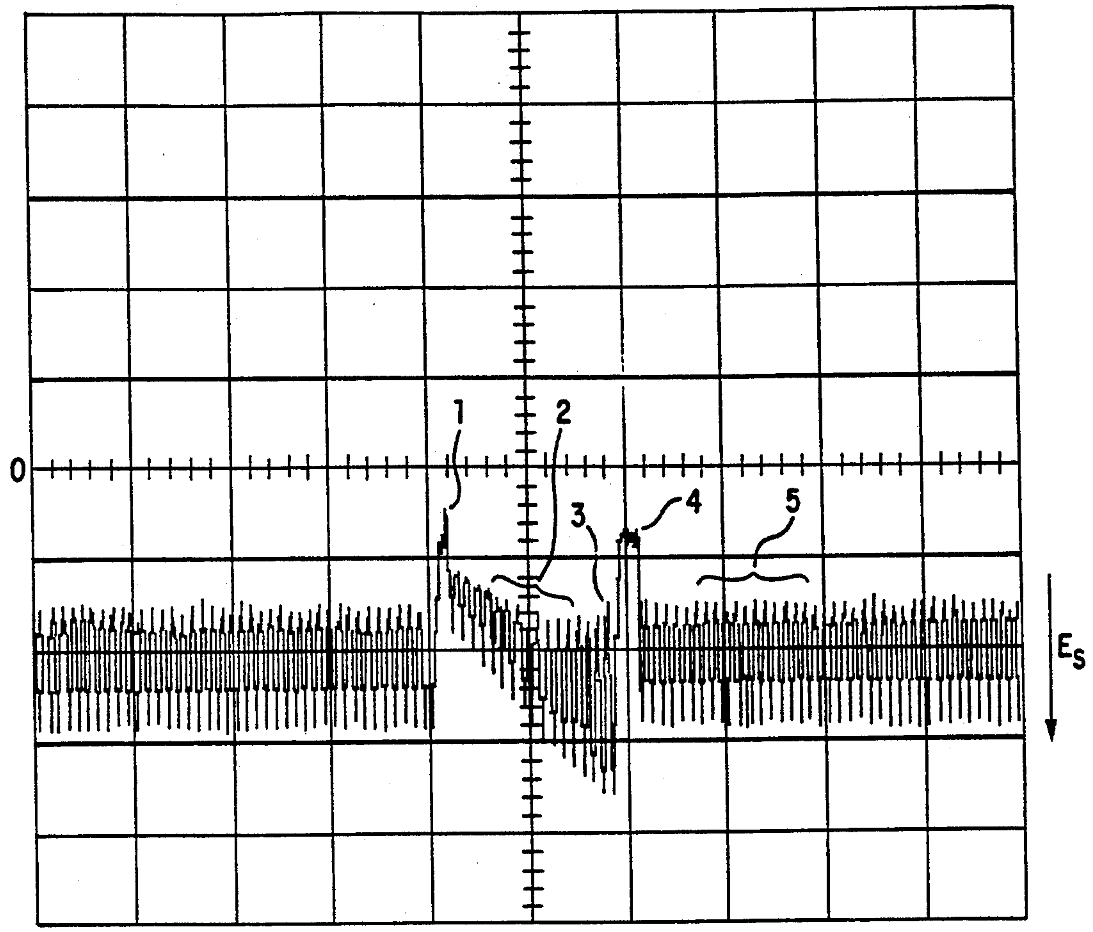
FIG. 4 is a waveform signal diagram for the secondary voltage preceding, during and subsequent to a back corona test cycle.
Figure 5:
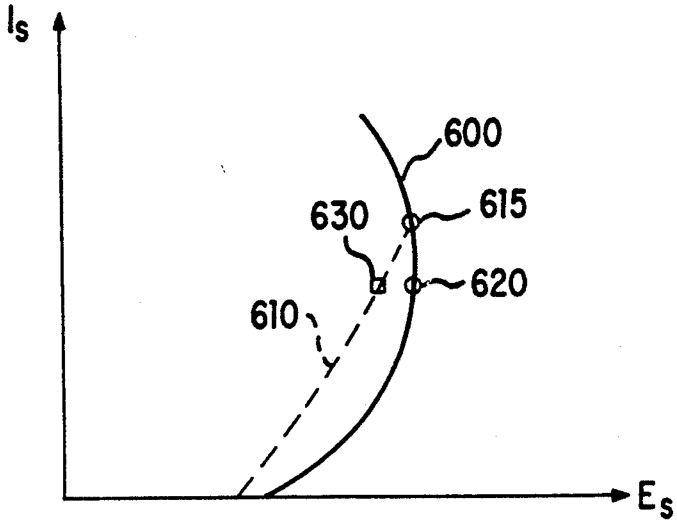
FIG. 5 is a graphical representation of secondary current versus secondary voltage.
Figure 6:
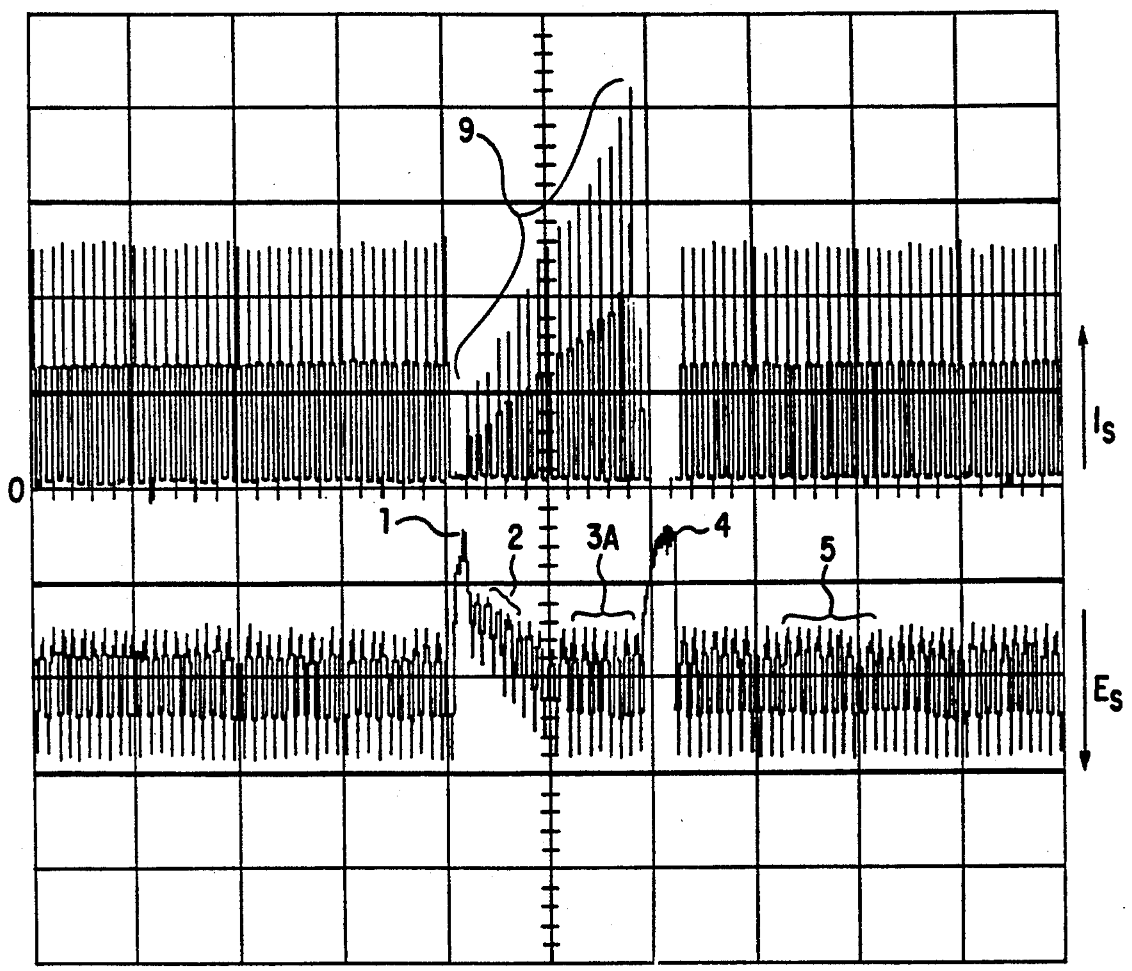
FIG. 6 is a signal waveform diagram showing both secondary current and secondary voltage preceding, during and subsequent to a back corona test cycle; and, FIG. 7 is a signal waveform diagram of secondary voltage during the intermittent energization mode.

It is of particular importance to note that back corona detection is initiated with a reduction of power to quench back corona in block 540, and concluded with a reduction in power to again quench back corona in block 495, as noted by points 1 and 4 of FIGS. 4 and 6. Referring to FIG. 5, there is shown a graph representing secondary current versus secondary voltage in an electrostatic precipitator. As shown by the graph line 600 a point 615 is reached wherein the secondary voltage begins to decrease as the secondary current increases further. The point 615 is known as the knee-of-the-curve, and indicates the initiation of back corona. Ideally, the system should be operated at the point 620, a point slightly below the knee-of-the-curve, to provide the maximum voltage to the precipitator without inducing back corona. In prior art systems, once the point 615 is detected, the voltage is reduced in an attempt to operate the system at the point 620. However, the voltage-current characteristic of electrostatic precipitators exhibits a hysteresis-like characteristic such that when the voltage is reduced from point 615, the curve 610 then represents the voltage-current characteristic. Thus, when such systems are set to operate at the secondary current to provide the optimum secondary voltage indicated by point 620 by simply reducing the current, in fact provide a secondary voltage indicated by point 630 on line 610, and therefore does not provide the optimum secondary voltage, it provides a voltage which is less than optimum. Whereas system 200 by quenching the back corona and then bringing the current and voltage back up to the predetermined secondary current desired always provides the desired operating point 620 indicated by curve 600, and therefore maximizes the secondary voltage provided to the precipitator for the selected secondary current. By this method system 200 operates at the true knee-of-the-curve.

Referring now to FIG. 4, there is shown, a diagram representing the precipitator voltage waveforms versus time, and in particular, a back corona detection test. As previously described, the system automatically tests for back corona at regular predetermined periodic intervals, the test being initiated by reducing power to quench any prior back corona condition, as indicated at 1. As shown at 2, as the precipitator voltage is ramped up (negatively increasing voltage) the minimum peaks decrease, become more negative. At 3 the minimum peak voltage has begun to increase, become more positive, thus indicating the presence of back corona. The system in response to detection of back corona stores the secondary current and voltage values for calculating a new system operating point. Following detection of back corona the system reduces power, at 4, to quench the back corona, which is followed by re-energization, at 5, utilizing the calculated system limits for determining the secondary current in which the precipitator is to be operated, a value slightly less than the current at which back corona was detected.

Referring now to FIG. 6, there is shown a graphical representation of both the precipitator voltage and precipitator current versus time, and more particularly showing the voltage and current waveforms during a back corona test. Here again, the back corona test is initiated by a reduction in power to quench any prior back corona which may have been generated during the course of operating the precipitator since the last test had been performed. At point 2 the minimum peak voltage is constantly decreasing, becoming more negative, while at the same time the secondary current is constantly increasing, as shown at 9. As shown at 3A, the minimum peak voltage has leveled off, remained substantially constant over several AC cycles, while the current, at 9, has continually increased, thereby indicating the presence of back corona. As has previously been described, when the presence of back corona is detected the power is reduced to quench the back corona condition, at 4, the values of secondary current and voltage at which back corona was detected are stored and a new operating point for the system is calculated. Following the end-of-test quench, the system is brought back to continuous operation with the secondary current being set at a value slightly less than the current value at which back corona was established.

Figure 7:
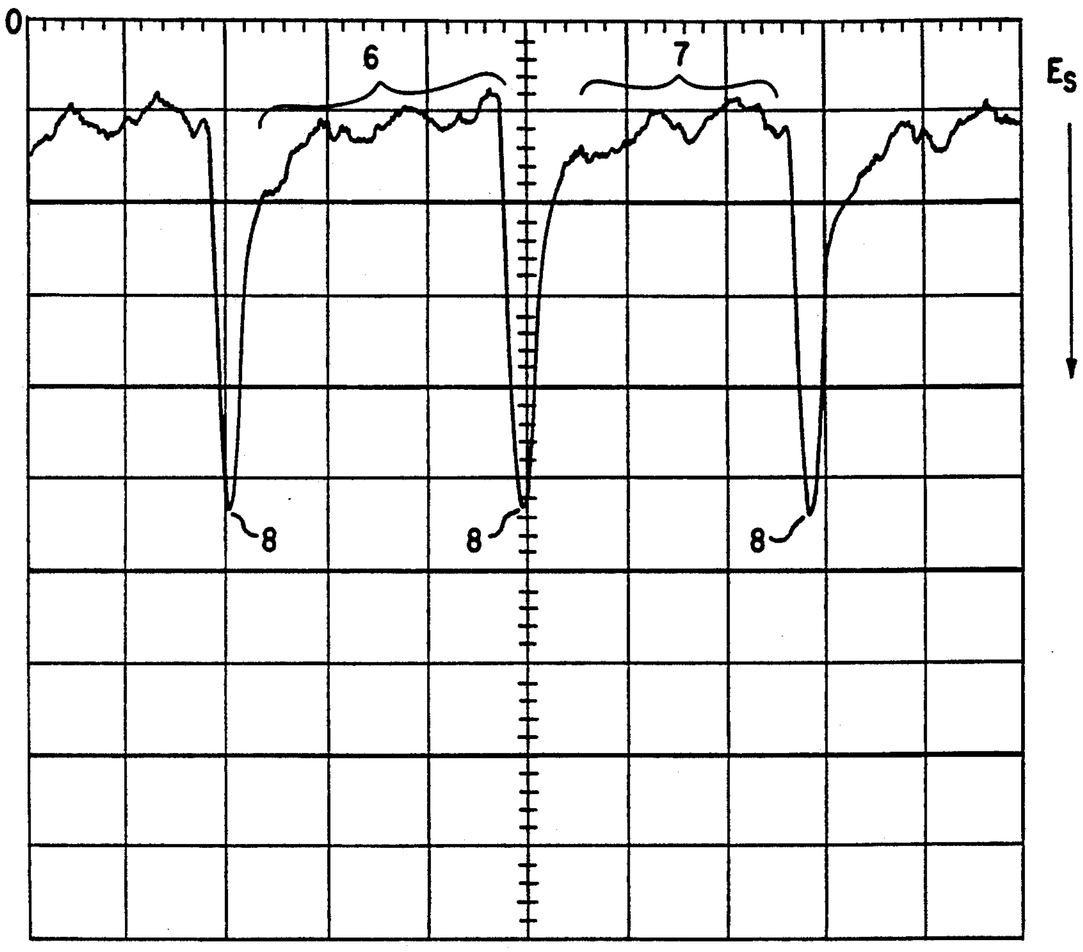

Referring now to FIG. 7, there is shown, a voltage waveform representation of the precipitator voltage during the intermittent mode of operation. During the intermittent mode operation is periodically interrupted, the previously described back corona tests are conducted followed by intermittent mode pulse repetition rate optimization, wherein a ratio of "on" to "off" cycles is determined for maximizing "on" time while not creating a back corona condition. As shown at 8, the precipitator is energized by voltage pulses having a duration of one-half cycle, separated by an "off" period defined by a plurality of "off" half-cycles. As previously described, the optimization procedure starts with the number of "off" half-cycles being at a predetermined maximum value. The number of "off" half-cycles being sequentially reduced while the minimum peak voltages 6, 7 are monitored to determine when the peak voltage has increased, become more positive, by a predetermined increment. When that increase in minimum peak value is detected, the number of "off" half-cycles is increased by a predetermined amount, and that ratio of "on" to "off" cycles utilized for continued operation until the next back corona test cycle has been initiated.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. An automatic back corona detection and protection system for controlling an electrostatic dust precipitator, comprising:

a. means for monitoring voltage and current parameters of a high voltage transformer/rectifier of said electrostatic dust precipitator;
b. first means for detecting a back corona condition coupled to said monitoring means;
c. second means for detecting a back corona condition coupled to said monitoring means; and,
d. control means coupled to both said first and second back corona detecting means for controlling input power to said high voltage transformer/rectifier responsive to detection of a back corona condition by either said first or second detecting means.

2. The automatic back corona detection and protection system as recited in claim 1 further comprising timing means coupled to said control means for periodic enablement of both said first and second detecting means.

3. The automatic back corona detection and protection system as recited in claim 2 where said control means includes test means for de-energizing said high voltage transformer/rectifier for a predetermining time period responsive to a signal from said timing means, said de-energizing being followed by re-energization where said input power is increased at a predetermined rate.

4. The automatic back corona detection and protection system as recited in claim 3 where said first detecting means identifies to said control means an onset of a back corona condition responsive to a lack of decrease in a minimum peak voltage value of an output voltage of said high voltage transformer/rectifier coincident with an increase in an output current value of said high voltage transformer/rectifier as said input power to said high voltage transformer/rectifier is increased.

5. The automatic back corona detection and protection system as recited in claim 4 where said second detecting means identifies to said control means an onset of a back corona condition responsive to a increase in said minimum peak voltage value of said output voltage of said high voltage transformer/rectifier as said input power to said high voltage transformer/rectifier is increased.

6. The automatic back corona detection and protection system as recited in claim 5 where said control means (1) stores an output voltage value of said high voltage transformer/rectifier, (2) stores said output current value of said high voltage transformer/rectifier, (3) removes power from said high voltage transformer/rectifier for a predetermined time period, and (4) re-energizes said high voltage transformer/rectifier utilizing said stored output voltage and current values to calculate operating limits for precipitator operation responsive to said identification of said back corona onset condition from either said first or second detecting means.

7. The automatic back corona detection and protection system as recited in claim 6 where said calculated limits provide said precipitator operation at an output current value a predetermined percentage less than said stored output current value to substantially prevent back corona.

8. The automatic back corona detection and protection system as recited in claim 1 further comprising means for optimizing a pulse repetition rate for intermittent energization of said electrostatic dust precipitator.

9. The automatic back corona detection and protection system as recited in claim 8 where said optimizing means includes means for monitoring minimum peak voltage values.

10. The automatic back corona detection and protection system as recited in claim 9 where said optimizing means further includes means for varying a number of off time periods between successive on time periods.

11. The automatic back corona detection and protection system as recited in claim 10 where said off period varying means increments and decrements two of said off time periods at a time.

12. A method for optimizing the intermittent energization type of operation of an electrostatic dust precipitator to substantially prevent back corona, said method comprising the steps of:

a. energizing said precipitator with voltage pulses at a predetermined minimum pulse repetition rate;
b. incrementally decreasing the time between said voltage pulses by a predetermined amount;
c. monitoring a minimum peak voltage value during said time between said voltage pulses;
d. repeating steps b and c until a predetermined change in said minimum peak voltage value is detected; and,
e. incrementally increasing the time between said voltage pulses by a predetermined amount.

13. The method for optimizing as recited in claim 12 where the steps a–e are repeated at predetermined time intervals.

14. The method for optimizing as recited in claim 12 where the step of incrementally decreasing the time between said voltage pulses includes decreasing the time between said voltage pulses in incremental values substantially equal to twice the on time of said voltage pulses.

15. The method for optimizing as recited in claim 12 where the step of incrementally increasing the time between said voltage pulses includes increasing the time between said voltage pulses in incremental values substantially equal to twice the on time of said voltage pulses.

16. An automatic back corona detection and protection system for controlling an electrostatic dust precipitator, comprising:

a. means for monitoring voltage and current parameters of a high voltage transformer/rectifier of said electrostatic dust precipitator;
b. first means for detecting a back corona condition coupled to said monitoring means, said first detecting means identifying to said control means an onset of a back corona condition responsive to a lack of decrease in a minimum peak of voltage value of an output voltage of said high voltage transformer/rectifier coincident with an increase in an output current value of said high voltage transformer/rectifier as said input power to said high voltage transformer/rectifier is increased;

c. second means for detecting a back corona condition coupled to said monitoring means, said second detecting means identifying to said control means an onset of a back corona condition responsive to a increase in said minimum peak voltage value of said output voltage of said high voltage transformer/rectifier as said input power to said high voltage transformer/rectifier is increased;

d. control means coupled to both said first and second back corona detecting means for controlling input power to said high voltage transformer/rectifier responsive to detection of a back corona condition by either said first or second detecting means; and, e. timing means coupled to said control means for periodic enablement of both said first and second detecting means, whereby operating conditions which are conducive to back corona conditions are automatically periodically determined and used to limit said input power to substantially prevent back corona in said precipitator.

17. The automatic back corona detection and protection system as recited in claim 16 further comprising means for optimizing a pulse repetition rate for intermittent energization of said electrostatic dust precipitator.

* * * * *